US007005662B2

(12) United States Patent
Caron et al.

(10) Patent No.: US 7,005,662 B2
(45) Date of Patent: Feb. 28, 2006

(54) SOIL WATER POTENTIAL DETECTOR

(76) Inventors: Jean Caron, 553 des Prairies, St-Romuald, Québec (CA) G6W 3K3; Jocelyn Boudreau, 3346 rue Maricourt, apt. 3, Ste-Foy, Québec (CA) G1W 2M1

( * ) Notice: Subject to any disclaimer, the term of this patent is extended or adjusted under 35 U.S.C. 154(b) by 219 days.

(21) Appl. No.: 10/600,328

(22) Filed: Jun. 23, 2003

(65) Prior Publication Data

US 2004/0257574 A1    Dec. 23, 2004

(51) Int. Cl.
*G01N 15/06* (2006.01)
(52) U.S. Cl. .................................. 250/573; 250/559.4
(58) Field of Classification Search ................ 250/557, 250/573, 559.4; 340/602, 603, 604; 356/53, 356/436
See application file for complete search history.

(56) References Cited

U.S. PATENT DOCUMENTS

| 3,847,351 | A |   | 11/1974 | Hasenbeck .................... 239/63 |
| 4,641,524 | A |   | 2/1987 | Tarvin ...................... 73/335.01 |
| 4,899,047 | A | * | 2/1990 | Cry et al. .................... 356/436 |
| 5,005,005 | A |   | 4/1991 | Brossia et al. ............... 340/604 |
| 5,117,855 | A |   | 6/1992 | Goldsmith .................. 137/78.3 |
| 5,341,831 | A |   | 8/1994 | Zur ............................ 137/78.3 |
| 5,364,797 | A |   | 11/1994 | Olson et al. ................. 436/501 |
| 5,568,405 | A |   | 10/1996 | Easton et al. ................ 702/159 |
| 5,651,500 | A |   | 7/1997 | Patterson et al. .............. 239/69 |
| 5,966,477 | A |   | 10/1999 | Johnson ......................... 385/12 |
| 6,079,433 | A |   | 6/2000 | Saarem .......................... 137/1 |
| 6,119,535 | A |   | 9/2000 | Tambo et al. .............. 73/865.8 |
| 6,254,350 | B1 |   | 7/2001 | Koenig et al. ................ 413/36 |
| 6,559,659 | B1 |   | 5/2003 | Cuming ...................... 324/694 |

FOREIGN PATENT DOCUMENTS

| EP | 1183944 A | 3/2002 |
| FR | 2701116 A | 1/1993 |
| WO | WO 01/41555 A | 6/2001 |

* cited by examiner

*Primary Examiner*—David Porta
*Assistant Examiner*—Tony Lu
(74) *Attorney, Agent, or Firm*—Ogilvy Renault, LLP; Robert Mitchell

(57) ABSTRACT

The present invention related to a water detector for use in determining the presence of sufficient water in irrigation systems and plant cultures in general. The detector includes a probe and the presence of water in a soil induces modifications in the optical properties of the probe. The optical properties are monitored and used to control the activation or deactivation of the irrigation system, emit a warning signal or provide a reference value of water potential for monitoring purposes.

17 Claims, 1 Drawing Sheet

SOIL WATER POTENTIAL DETECTOR

BACKGROUND OF THE INVENTION i) Field of the Invention

The present invention relates to a soil water detector and more particularly to a device for monitoring water potential within a soil. The present invention also relates to a water potential detector for an irrigation system comprising a probe that allows the monitoring of water content within the soil.

ii) Description of Prior Art

Saving irrigation water is an increasing concern among growers. Actually, reliable soil water content or suction measurements are the basics of a proper irrigation management for saving water and fertilisers. In nursery and greenhouse production, the water available to plants is stored within the potted substrate. As the amount of water remains limited by the volume of the container, additional water therefore needs to be added to the crop through different irrigation systems. Irrigation water is also needed for vegetable and orchard crops to improve yield, since such productions are often grown on coarse and sandy soils to provide a good drainage. However, as a result of this fast drainage, soil water retention is limited. In addition to the fact that the risk of drought increases with global warming, the proper tools used to initiate irrigation are limited.

Usually, irrigation is scheduled based on meteorological data, visual inspection (colour of soil or substrate), appearance of the crop or use of timers. Soil moisture sensors represent an alternative to the more conventional techniques for scheduling irrigation. Sensors are designed to measure the suction forces retaining water within the soil matrix, which is commonly referred as soil water potential. Water potential is defined as the potential energy of water per unit mass of water in the system. The total water potential of a soil is the sum of four component potentials: gravitational, matrix, osmotic, and pressure. Gravitational potential depends on the position of water in a gravitational field. Matric potential depends on the adsorptive forces binding water to a matrix. Osmotic potential depends on the concentration of dissolved substances in water. Pressure potential depends on the hydrostatic or pneumatic pressure on water. Matric potential is a force strong enough to prevent water from being absorbed by the plant and in non saline soil, matric potential is the dominant driving force limiting water availability to plant. Therefore, the measurement of matric potential is very advisable for water and irrigation management.

Different soil water potential sensors have been described in the art. However, the existing devices suffer from limitations. For managing irrigation in organic growing media, such as nurseries or greenhouse crops, time or frequency domain reflectometry systems constitute alternatives. These technologies measure soil water content, a parameter indirectly linked to soil water potential. These technologies however face important reliability problems since the length of the electrodes needed with such technology in small size pot is not sufficient and their price is very high. In addition, it was demonstrated that the signal is sensitive to soil solution having high electrical conductivity. Moreover, these systems require calibration to infer water potential and therefore lack of accuracy, especially in organic growing media. Other types of sensors which directly measure soil water potential are accurate but are very expensive and tricky to use. Indeed, the output signal of these sensors often need a human interpretation and most of these devices have to be routinely calibrated. Finally, most of the proposed sampling devices are not designed to properly start the irrigation and without signal interpretation neglect the adequate interruption of irrigation.

Recently, a simple electro-optical device that may operate in growing media was introduced. This device is based on the use of an infrared light emitting diode and photodiode. The LED diode emits a light signal, which is transmitted in higher amount as the water content increases in a porous translucent body made from nylon. Although this technology appeared promising, nylon filter coupled with LED gave unreliable results. Indeed, the proper operation of a nylon filter in growing media requires pores that are quite large i.e. pores having at least a 30 $\mu$m diameter. Moreover, it requires a good contact area, a proper response time and a structure sufficiently strong to allow the insertion of the device into the growing media without loosing contact with the soil. Unfortunately, these important characteristic cannot be reached with the nylon filter. Moreover, it is known in the art that nylon filters provide an output signal that needs interpretation, a feature convenient for researchers but inappropriate for growers.

For example, U.S. Pat. No. 4,899,047 Cry et al. describes a device to detect the presence of oil in water by placing a translucent, porous body of hydrophobic material in contact with the oil and water and detecting the amount by which light incident on the body is attenuated on propagation through the body. This action is carried out using a translucent probe including a porous treated polyethylene material capable of absorbing liquid.

Considering the state of the art described above, it would be highly desirable to be provided with a soil water potential measurement device that can be used to control the initiation and the termination of an irrigation, which is efficient, affordable and easy-to-use.

SUMMARY OF THE INVENTION

One aim of the present invention is to provide a porous probe made of an agglomerated material and designed to be inserted in a solid medium e.g. a soil in which the humidity level or liquid saturation can vary. The optical properties of the probe are modified depending on whether a liquid such as water, has reached a given potential (or suction value). At high suction, little water is absorbed by the porous probe from the soil and the optical properties suddenly change from transmittance when wet (low suction) to opalescent.

Another aim of the present invention is to provide a device for measuring the availability of a liquid in a medium, wherein the measuring device comprises at least one probe made of a porous agglomerated material. This porous probe is designed to be inserted in the solid medium, where its optical properties are modified in the presence of a liquid, such as water, therein. The probe is associated with a means for monitoring its optical properties, as modified by the presence of the liquid.

More particularly, the present invention relates to a liquid detector for determining absence or presence of a liquid in a solid, which comprises:

at least one probe adapted for intimate contact with the solid, and comprising a light impervious material capable of absorbing the above mentioned liquid, and gradually becoming translucent as the liquid is being absorbed therein;

means associated with the probe for detecting light translucency in the light impervious material after the light impervious material has absorbed the liquid therein; and signal means operating in response to the light translucency detecting means to indicate the presence of the above liquid in the impervious material, wherein the light impervious material comprises a porous fritted material.

Still, more particularly, the invention relates to an apparatus for detecting the absence or presence of water at a given potential value in the soil.

The invention also relates to a method for determining the presence of a liquid in a solid, which comprises, providing at least one probe adapted for intimate contact with the solid, the probe comprising a light impervious material gradually becoming translucent as the liquid is being absorbed therein and comprising a porous fritted material capable of absorbing the liquid;

inserting the probe into the soil and absorbing the liquid in the light impervious material;

detecting light translucency in the light impervious material after the light impervious material has absorbed the liquid therein; and converting the results obtained when detecting light translucency into an indication of the presence of the liquid in the light impervious material

BRIEF DESCRIPTION OF DRAWING

Having thus generally described the nature of the invention, reference will now be made to the accompanying drawing, showing by way of illustration, a preferred embodiment thereof, and in which.

It will be noted that throughout the appended drawing, like features are identified by like reference numerals.

DESCRIPTION OF PREFERRED EMBODIMENT

Figure 1:
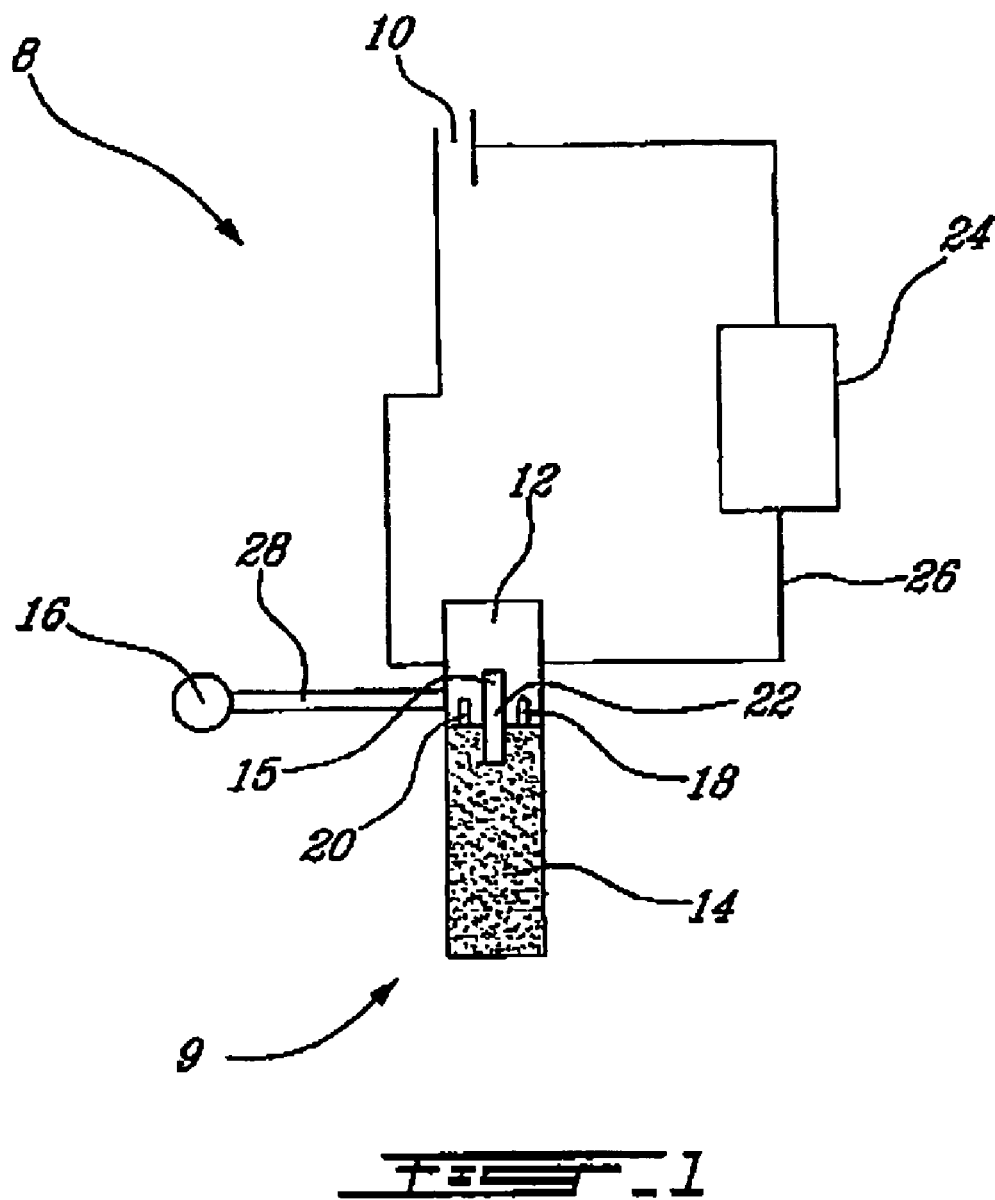
FIG. 1 is a schematic illustration of a water detector according to the present invention.

With reference to the drawing, it will be seen that a liquid detector 8 according to the invention comprises a probe generally identified by reference numeral 9, that consists of a cylindrical porous member 14 made of a light impervious, porous, fritted material that will be described more in detail later. It will be understood that the porous member 14 is fixed to a cylindrical support 12 as shown.

Also as shown, liquid detector 8 includes a circuitry permitting to determine if water is available for the purpose of the grower.

More particularly, it will be seen that porous member 14 has an upper portion 15 that extends inside support 12 as shown. Inside support 12, there is also provided an LED diode 18 that emits light rays in a direction transverse to upper portion 15. In addition, there is provided a photodiode 20 that is also mounted inside support 12 in known manner and that operates in response to light 22 emitted by the LED diode 18. If the light emitted by LED diode 18 passes through portion 15, it will be received by photodiode 20 that will operate to activate an indicator, here a buzzer 16. LED diode 18 and photodiode 20 are connected on one hand to control device 24, and on the other hand to buzzer 16, through electronic circuitry schematically illustrated at 26 and 28 respectively. To operate liquid detector 8, a power supply 10 is provided, and the choice is left entirely to one skilled in the art.

The nature of porous member 14 is critical for a proper operation of the water detector according to the invention. Essentially, porous member 14 and its upper portion 15 are made of a light impervious material that gradually becomes translucent as it absorbs water. To achieve this it has been found that the light impervious material is preferably made of porous fritted material. A preferred material is one obtained by filling glass beads in a metal mold and gradually heating them until achieving melting at the contact points between the beads. The partially fused beads are then slowly cooled to avoid cracking. The nature of the glass beads, the temperature steps involved in obtaining a fritted material and the size of the mould are chosen in dependence of the specific speed at which water is absorbed or desorbed by the light impervious material or saturate the material at a given soil water potential.

When the soil in which probe 9 is introduced, is dry, porous member 14 remains dry and therefore is opalescent, thereby preventing the passage of light through it. This results in the production of a message sent by the LED diode-photodiode 18, 20 to buzzer 16, indicating that there is a need for more water or inversely. It will be recognized by someone skilled in the art that the buzzer can be replaced by a visual, or electronic warning signal, or any other kind of signal. The warning signal can alternatively be transmitted through visible light, infrared or ultraviolet radiations, or the like. In the latter case, light or radiations may be calibrated to determine light translucency degrees corresponding to predetermined quantities of liquid in the solid.

The length, the shape, and the size of the probe support can vary depending on the targeted use. Here, it has been illustrated as cylindrical. This shape may of course vary at great length.

The indicator can be programmed to automatically activate, for example but is not limited to, an irrigation system. In such a case, when the soil, and therefore the porous member 14 including the upper portion thereof become saturated with water, the electronic management system is turned on hold, and the indicator may be turned off.

It is understood that LED diode 18 as well as photodiode 20 can be remote from the probe while respectively sending and receiving light signals through optic fibers.

The optical properties of the porous member 14 can be modified with respect to the physico-chemical properties of the liquid to be detected.

As one purpose of the present invention is the control of soil irrigation systems, the liquid for which the present invention was designed is principally water. However, a skilled artisan could benefit from the particular properties of the invention for other uses such as measuring the level of a liquid contaminant in a soil or evaluating the liquid retention properties of a particular material (e.g. an insulating material). Therefore, any liquid that could modify the optical properties of the probe would be considered as embodied by the present invention.

The probe of the present invention is generally cylindrical and usually 10 to 100 mm, long. It can also be disk shaped for specific applications (sensing the potential in a porous body like a capillary mat or a surface soil for example). The length of the probe and its shape are designed to optimize the sampling of the medium in which it is inserted. The length of probe 9 can be adjusted depending on the needs for which it is used. For example, in mineral soils in which monitoring suction or water content are located at different levels, the probe for stopping irrigation should be positioned deeper than the rooting system. Also, for subirrigation devices, i.e. irrigation from the bottom to the top of the medium, the probe for stopping irrigation should be placed at the bottom of the recipient to be irrigated, as water rises very slowly from the bottom to the top part of the pot. On the contrary, the probe for starting irrigation should be located in the mid root zone for both mineral soils and subirrigation systems. Therefore, proper irrigation ideally requires two probes (one in the root zone to start irrigation, and one at the bottom to stop it) or one sensor made of two porous probes, each porous probe having its own LED photo diode reading system.

More particularly, it will be seen that porous member 14 has an upper portion 15 that extends inside support 12 as shown. Inside support 12, there is also provided an LED diode 18 that emits light rays in a direction transverse to upper portion 15. In addition, there is provided a photodiode 20 that is also mounted inside support 12 in known manner and that operates in response to light 22 emitted by the LED diode 18. If the light emitted by LED diode 18 passes through portion 15, it will be received by photodiode 20 that will operate to activate an indicator, here a buzzer 16. LED diode 18 and photodiode 20 are connected on one hand to control device 24, and on the other hand to buzzer 16, through electronic circuitry schematically illustrated at 26 and 28 respectively. To operate liquid detector 8, a power supply 10 is provided, and the choice is left entirely to one skilled in the art.

To insure the transmittance of light, the material used for the fabrication of the porous member must be, at least, translucent by itself. For example, glass beads or stone dust may be used. The porous member can be made by filling a metallic mold with glass beads and heating them in incremental steps, to a degree merely sufficient to provoke a melting at the points of contact between glass beads. The fused glass beads are then slowly cooled down, to avoid cracking. Glass beads, temperature steps and mould size are chosen depending on the intended application so that water enters or is released from the bead mixture at specific speed and saturates the porous member at selected soil water potential. Light transmittance changes in the porous member induced by the substrates and the soil water are important enough to allow the transmission of infrared light under saturated conditions.

The agglomerated fritted material may be adapted specifically to the nature of the soil and to the limit of the cut-off be point to be reached. The soil has a natural potential (threshold potential) at which water movement to the plant becomes limiting. The size of the glass beads has to be properly adapted so as to change it translucency around that potential. Therefore, when the tip is in contact with the soil, it equilibrates to the same potential. If the threshold potential is reached, the porous tip suddenly changes its translucence. Therefore, the porosity of the fritted material could be adapted, for example, to growing media for nursery, for greenhouses or to mineral soils. Moreover, the agglomerated fritted material should bet adapted to a specific use. For example, the fritted material can be used for initiating or stopping irrigation, or may be adapted to the nature of a soil such as growing media for vegetable, for ornamental crops, nurseries, or mineral soils, As the probe is custom made, there is no need for subsequent calibration or adjustments.

Alternatively, the sensor can be made such that changes in optical transmitting properties of the porous member are gradually monitored dependent on the water content therein. A proper size distribution of the beads used to manufacture can also be useful to do so.

Systems for dual-sampling i.e. simultaneously sampling at two different levels can be manufactured to efficiently start and stop irrigation with increased efficiency. In that case, the principle relies on locating two porous probes according to the invention at two different levels, one at the top initiating the irrigation and the other one at the bottom, stopping the irrigation. The critical properties of the probes may vary. Both probes can be connected to the same electronic circuit or to independent circuits. The dual-sampling system can also be inverted for subirrigation management. In a device for sampling at two different levels, both probes are desaturated almost simultaneously. However, in rising irrigation systems, it is known that proper rewetting occurs when free water reaches a given height from the bottom of the recipient and therefore irrigation may be stopped when water resaturates the lowermost probe. The dual sampling system is efficient even if the top part of the soil is dry. Such a system would considerably improve water savings during irrigation.

While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features herein before set forth, and as follows in the scope of the appended claims.

We claim:

1. A liquid detector for determining presence of a liquid in a solid, which comprises
   at least one probe adapted for intimate contact with said solid, said probe comprising a light impervious material capable of absorbing said liquid and gradually becoming translucent as said liquid is being absorbed therein;
   means associated with said probe for detecting light translucency in said light impervious material after said light impervious material has absorbed said liquid therein; and
   a signal means operating in response to said light translucency detecting means to indicate the presence of said liquid in said light impervious material,
   wherein said light impervious material comprises a porous fritted material capable of absorbing said liquid.

2. The liquid detector according to claim 1, wherein said signal means is operative to additionally determine the quantity of said liquid in said solid.

3. The liquid detector according to claim 1, wherein said probe is an aqueous liquid probe.

4. The liquid detector according to claim 1, wherein said probe is cylindrical and is mounted on a probe support.

5. The liquid detector according to claim 1, wherein said light translucency detecting means is disposed in said probe support, said probe has an upper portion thereof extending in said probe support in a position to allow operation of said light translucency detecting means.

6. The liquid detector according to claim 1, wherein said translucency detecting means comprises a LED diode-photodiode capable of activating a light signal.

7. The liquid detector according to claim 6, wherein said LED diode and said photodiode respectively emits and receives light by means of optic fiber means.

8. The liquid detector according to claim 1, wherein said signal means comprises a buzzer.

9. The liquid detector according to claim 1, wherein said porous fritted material is selected from the group consisting of quartz, silica, sapphire, aluminosodic borosilicate glass, and stone dust.

10. The liquid detector according to claim 6, wherein said LED diode-photodiode generates visible light, infrared and ultra violet radiations.

11. The liquid detector according to claim 10, wherein said visible light, infrared and ultra violet radiations are calibrated to determine light translucency degrees corresponding to predetermined quantities of said liquid in said solid.

12. The liquid detector according to claim 1, comprising control means to activate operation of said light translucency detecting means and said signal means.

13. The liquid detector according to claim 12, wherein said control means comprise an electronic chip.

14. The liquid detector according to claim 1, wherein said detecting means and said signal means rare adjusted to indicate liquid saturation level of said impervious material.

15. A water detector for determining water availability in a soil for use in plant cultivation, which comprises:
at least one water probe adapted to be introduced a predetermined depth into said soil;
said water probe comprising a light impervious material capable of absorbing water and gradually becoming more translucent as water is being absorbed therein;
means associated with said water probe for detecting light translucency in said light impervious material following water absorption therein; and
signal means operating in response to said light translucence detecting means to determine degrees of said light translucency corresponding to quantities of water in said soil and indicate whether or not said soil is in need of additional water.

16. A method for determining presence of a liquid in a solid, which comprises,
providing at least one probe adapted for intimate contact with said solid, said probe comprising a light impervious material gradually becoming translucent as said liquid is being absorbed therein and comprising a porous fritted material capable of absorbing said liquid;
inserting said probe into said soil and absorbing said liquid in said light impervious material;
detecting light translucency in said light impervious material after said light impervious material has absorbed said liquid therein; and
converting results obtained when detecting said light translucency into an indication of the presence of said liquid in said light impervious material.

17. The method according to claim 16, which comprises converting said results to additionally determine the quantity of said liquid in said solid.

* * * * *